(12) United States Patent
Zhang et al.

(10) Patent No.: US 8,068,465 B2
(45) Date of Patent: Nov. 29, 2011

(54) WIRELESS MULTICAST BROADCAST SERVICE METHODS AND APPARATUS

(75) Inventors: Jianzhong Zhang, Irving, TX (US); Raja S. Bachu, Des Plaines, IL (US); Zhijun Cai, Euless, TX (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 686 days.

(21) Appl. No.: 11/590,724

(22) Filed: Oct. 31, 2006

(65) Prior Publication Data
US 2008/0101326 A1 May 1, 2008

(51) Int. Cl.
*H04B 7/216* (2006.01)
(52) U.S. Cl. ........ 370/335; 370/336; 370/345; 370/350; 455/434
(58) Field of Classification Search ........................ None
See application file for complete search history.

(56) References Cited

U.S. PATENT DOCUMENTS

| | | | |
|---|---|---|---|
| 6,865,177 B1* | 3/2005 | Park et al. | 370/350 |
| 2002/0181634 A1* | 12/2002 | Yang et al. | 375/354 |
| 2003/0174686 A1* | 9/2003 | Willenegger et al. | 370/342 |
| 2005/0020260 A1* | 1/2005 | Jeong et al. | 455/434 |
| 2005/0276238 A1 | 12/2005 | Dabak et al. | |
| 2005/0281290 A1 | 12/2005 | Khandekar et al. | |
| 2006/0013325 A1* | 1/2006 | Agrawal et al. | 375/260 |
| 2006/0039451 A1* | 2/2006 | Zhuang et al. | 375/145 |
| 2006/0239370 A1* | 10/2006 | Mody et al. | 375/260 |
| 2007/0133390 A1* | 6/2007 | Luo et al. | 370/208 |

FOREIGN PATENT DOCUMENTS
KR 0605977 7/2008

OTHER PUBLICATIONS

3rd Generation Partnership Project; Technical Specification Group Radio Access Network; Physical channels and mapping of transport channels onto physical channels (FDD) (release 7) 3GPP TS 25.211 V.7.0.0 (Mar. 2006).

(Continued)

*Primary Examiner* — Rafael Pérez-Gutiérrez
*Assistant Examiner* — Daniel Nobile
(74) *Attorney, Agent, or Firm* — Ingrassia Fisher & Lorenz, P.C.

(57) ABSTRACT

Embodiments include methods and apparatus associated with wireless multicast and/or broadcast services. A base station (102, FIG. 1) transmits data codes (504, 604, 702, FIGS. 5-7) within a radio frame (300, FIG. 3). The data codes are Code Division Multiple Access (CDMA) data codes, in an embodiment. The base station also transmits a Time Division Multiplexed (TDM) synchronization code (502, 608, 706, FIGS. 5-7), in an embodiment. The base station discontinuously transmits (1004, FIG. 10) a portion of a radio frame slot that is coincident in time with a duration of the TDM synchronization code, in various embodiments. The discontinuously transmitted portion of the radio frame slot may include Transport Format Combination Indicator (TFCI) bits (510, FIG. 5), pilot bits (710, FIG. 7), or data bits (612, FIG. 6), in various embodiments. A base station's transmissions may be synchronous in time and frequency with the transmissions of other base stations.

21 Claims, 4 Drawing Sheets

OTHER PUBLICATIONS

3rd Generation Partnership Project; Technical Specification Group Radio Access Network; Introduction of the Multimedia Broadcast Multicast Service (MBMS) in Radio Access Network (RAN) ; Stage 2 (Release 7) 3GPP TS 25.346 V.7.2.0 (Sep. 2006).

Yin, Nanying et al. Enhanced Broadcast-Mulitcast for HRPD, Qualcomm, C30-20040607-060.

Xu, Hao, et. al. Qualcomm-Motorola Harmonized EMB Proposal Final Presentation, C30-20050516-049.

Bhushan, Naga, et al., Rebuttal of TI EBM Final Presentation, C30-20050516-049.

Zhuang, Xiangyang, et al., Ranging Improvement for 802.16e OFDMA PHY, IEEE 802.16 Broadband Wireless Access Working Group http://ieee802.org/16 Jun. 25, 2004.

IP Wireless, Orange, Telefoncia, Overlay MBMS services using TDD spectrum, 3GPP TSG RAN WG2 #53, Shanghai, China, May 8-13, 2006, Tdoc R2-061304.

LG Electronics, Dual Receiver for MBMS, 3GPP TSG RAN WG2 #53, Shanghai, China, May 8-12, 2006, R2-061303.

Ericsson, Dedicated MBMS Carrier Using Common Transmitted Waveforms, 3GPP TSG RAN WG1 #46, Tallinn, Estonia Aug. 28-Sep. 1, 2006, R1-062268.

Dabak, Anand, OFDM versus CDMA comparasion for cellular systems, Texas Instruments, www.neevia.com.

Onggosanusi, Eko, et al, A backward compatible CDMA-based enhanced broadcast multicast (EBM) system for HRPD, 3GPP2 Technical Specification Group C, C20-20041019-011.

3rd Generation Partnership Project; Technical Specification Group Radio Access Network; Multiplexing and channel coding (FDD) (release 6) 3GPP TS 25 212V 620 (Jun. 2004).

\* cited by examiner

FIG. 1

| SLOT FORMAT | SLOT SIZE | CELL NUMBER FOR SELECTION COMBINING | CELL NUMBER FOR SOFT COMBINING | NUMBER OF TRANSPORT CHANNELS |
|---|---|---|---|---|
| 14 (SF=8) | 40 | 2 | NONE | 1 |
| 14 (SF=8) | 40 | NONE | 3 | 1 |
| 12 (SF=16) | 40 | 3 | NONE | 1 |
| 12 (SF=16) | 80 | 2 | NONE | 1 |
| 12 (SF=16) | 80 | NONE | 3 | 1 |
| 10 (SF=32) | 80 | 3 | NONE | 4 |
| 10 (SF=32) | 80 | NONE | 3 | 1 |
| 8 (SF=64) | 80 | 3 | NONE | 4 |
| 8 (SF=64) | 80 | NONE | 3 | 1 |
| 6 (SF=128) | 80 | 3 | NONE | 4 |
| 6 (SF=128) | 80 | NONE | 3 | 1 |
| 2 (SF=256) | 80 | 3 | NONE | 4 |
| 2 (SF=256) | 80 | NONE | 3 | 1 |

-PRIOR ART-

*FIG. 2*

-PRIOR ART-

*FIG. 3*

| Slot Format | Bit Rate (kbps) | Symbol Rate (ksps) | SF | Bit/Frame | Bits/Slot | $N_{DATA1}$ | $N_{PILOT}$ | $N_{TFCI}$ |
|---|---|---|---|---|---|---|---|---|
| 0 | 30 | 15 | 256 | 300 | 20 | 20 | 0 | 0 |
| 1 | 30 | 15 | 256 | 300 | 20 | 12 | 8 | 0 |
| 2 | 30 | 15 | 256 | 300 | 20 | 18 | 0 | 2 |
| 3 | 30 | 15 | 256 | 300 | 20 | 10 | 8 | 2 |
| 4 | 60 | 30 | 128 | 600 | 40 | 40 | 0 | 0 |
| 5 | 60 | 30 | 128 | 600 | 40 | 32 | 8 | 0 |
| 6 | 60 | 30 | 128 | 600 | 40 | 38 | 0 | 2 |
| 7 | 60 | 30 | 128 | 600 | 40 | 30 | 8 | 2 |
| 8 | 120 | 60 | 64 | 1200 | 80 | 72 | 0 | 8 |
| 9 | 120 | 60 | 64 | 1200 | 80 | 64 | 8 | 8 |
| 10 | 240 | 120 | 32 | 2400 | 160 | 152 | 0 | 8 |
| 11 | 240 | 120 | 32 | 2400 | 160 | 144 | 8 | 8 |
| 12 | 480 | 240 | 16 | 4800 | 320 | 312 | 0 | 8 |
| 13 | 480 | 240 | 16 | 4800 | 320 | 296 | 16 | 8 |
| 14 | 960 | 480 | 8 | 9600 | 640 | 632 | 0 | 8 |
| 15 | 960 | 480 | 8 | 9600 | 640 | 616 | 16 | 8 |
| 16 | 1920 | 960 | 4 | 19200 | 1280 | 1272 | 0 | 8 |
| 17 | 1920 | 960 | 4 | 19200 | 1280 | 1256 | 16 | 8 |

—PRIOR ART—

WIRELESS MULTICAST BROADCAST SERVICE METHODS AND APPARATUS

TECHNICAL FIELD

The inventive subject matter relates generally to wireless communications, and more particularly to delivery of broadcast and multicast data in wireless networks.

BACKGROUND

Various wireless communications networks offer features or specifications aimed at the efficient delivery of multimedia or other data formats on a multicast or broadcast basis. These networks include Universal Mobile Telecommunications System (UMTS) wideband Code Division Multiple Access (WCDMA) networks, which may be specified by 3GPP ($3^{rd}$ Generation Partnership Project), 3GPP2, ETSI (European Telecommunications Standards Institute), and/or the Institute of Electrical and Electronics Engineers (IEEE).

For example, an IEEE 802.16e specification defines a Multicast Broadcast Service (MBS), which exploits "single frequency networking" (SFN) principles to deliver service (e.g., mobile television) on an efficient, wide area basis. In an SFN network, multiple transmitters simultaneously send the same signal over the same frequency channel. High levels of spectral efficiency may be achieved for a broadcast or multicast service by simulcasting, on a fully time-synchronous and frequency-synchronous basis, shared Medium Access Control (MAC) layer Protocol Data Units (PDUs) using a common or identical set of radio resources in each cell. This may provide high orders of downlink macro-diversity (e.g., where multiple base stations transmit the same signals), which when combined with a lack of in-band interference, may lead to elevated receiver Signal-to-Noise Ratios (SNRs). These techniques may be capable of supporting relatively high modulation orders and forward error correction encoding rates.

In some systems, SFN techniques are associated with Orthogonal Frequency Division Multiplexing (OFDM) methods of wireless network multiple access. Other air interface specifications, such as the 3GPP2 Broadcast and Multicast Services (BCMCS) feature, seek to hybridize OFDM and CDMA approaches to air interface design by multiplexing components of a legacy CDMA air interface and an OFDM-based broadcast network on a Time Division Multiplexing (TDM) basis. For example, SFN methods may be applied to direct sequence CDMA networks, as exemplified by a 3GPP specification entitled "A Backward Compatible CDMA-Based Enhanced Broadcast Multicast (EBM) System for HRPD," 3GPP2 Technical Specification Group C, October 2004, C30-20041019-011.

Techniques for broadcast and multicast service delivery are also defined for networks based solely on CDMA principles in the absence of SFN methods. For example, the Multimedia Broadcast Multicast Service (MBMS), as part of the 3GPP Release-6 specifications, uses diversity techniques, such as soft symbol combining or selection combining for efficient transfer of data (e.g., multimedia content) to multiple user equipments (UEs) in a point-to-multipoint fashion. Methods of downlink macro-diversity that are based on soft combining or selection combining techniques generally may not be able to approach the receiver SNR's achievable using SFN methods.

Another proposal entitled "Dedicated MBMS Carrier Using Common Transmitted Waveforms," 3GPP TSG-RAN WG1 Meeting #46, August 2006, R1-062268 (herein "R1-062268"), applies an SFN approach to the 3GPP MBMS service. Specifically, R1-062268 proposes that only an orthogonal primary common control physical channel (P-CPICH) and one or more secondary common control physical channel (S-CCPCH) be transmitted by each participating base station (BS), in a time-synchronous and frequency-synchronous fashion, in a downlink spectrum cleared of interfering unicast transmitters or other radiators (e.g., the downlink spectrum is dedicated to MBMS). R1-062268 also proposes that each BS scramble its transmission using a common scrambling code. This approach may permit higher receiver SNRs to be achieved, and generally may improve wide-area broadcast channel spectrum efficiency However, this approach suffers from at least three major drawbacks.

First, according to R1-062268, primary synchronization channel (P-SCH) and secondary synchronization channel (S-SCH) symbols are not transmitted on the dedicated MBMS carrier frequency. Due to the lack of a synchronization channel on the dedicated MBMS carrier, UEs are forced to camp on, and extract synchronization information from, a companion unicast network. This may be inefficient and time-consuming, and may render redundant significant components of established and high performance UE P-SCH and S-SCH acquisition hardware.

A second drawback pertains to an argument, in R1-062268, that current wireless CDMA (or WCDMA) receiver architectures can deal with the increased channel time dispersion resulting from SFN operation without a major re-working of the receiver design. However, the increase in delay spread in networks with contemporary cell radii does not support this argument. Third, channel estimation using a code-division multiplexed pilot signal (e.g., a pilot signal based in the P-CPICH symbol) is susceptible to significant intra-cell interference in multi-path channels. This may be more pronounced in the case of an SFN channel with its increased median root mean square (RMS) delay spread, and may warrant further modification or enhancements of the current 3GPP Common Pilot Channel (CPICH) structure.

It is desirable to provide a solution that enhances the achievable receiver SNR of current wireless multicast and/or broadcast air interface designs (e.g., the 3GPP WCDMA Release-6 MBMS). In addition, it is desirable to provide a solution that does not warrant the deployment of additional synchronization equipment in BSs, and that permits UEs to access a dedicated enhanced MBMS carrier without having to access a companion unicast network. Additionally, it is desirable to provide a solution that enables sufficient channel estimation SNR to sustain higher spectrum efficiency in the broadcast service. In addition, it is desirable that a 3GPP MBMS specification evolution permit substantial re-use of existing terminal designs.

Other desirable features and characteristics of the present inventive subject matter will become apparent from the subsequent detailed description and the appended claims, taken in conjunction with the accompanying drawings and this background.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Embodiments described herein include methods and apparatus for providing broadcast multicast services in wireless networks using high speed downlink packet access (HSDPA) techniques. These networks include, but are not limited to, time-synchronous and frequency-synchronous networks, networks based on direct sequence code division multiple access (CDMA) principles, networks exploiting single frequency network (SFN) design methodologies, and networks broadly aligned with $3^{rd}$ Generation Partnership Project (3GPP) UMTS WCDMA specifications, including Multimedia Broadcast Multicast Service (MBMS) components of those specifications.

As will be explained in detail below, in various embodiments, a base station may transmit at least one data code (e.g., at least one Code Division Multiple Access (CDMA) data code) during the duration of a timeslot of a radio frame, where a common scrambling code has been applied to the at least one data code. In an embodiment, the base station transmits the at least one data code in time-synchronization and frequency-synchronization with at least one other base station. The base station also transmits a Time Division Multiplexed (TDM) synchronization code during a portion of the duration of the timeslot, in various embodiments.

Figure 1:
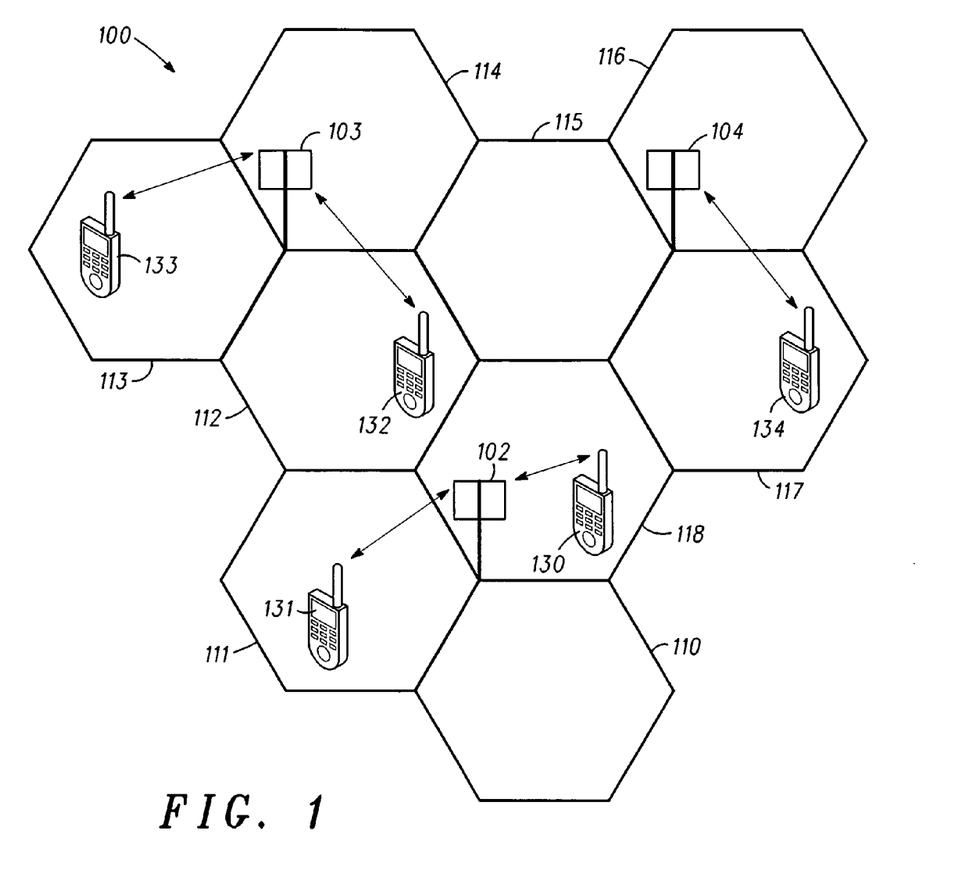
FIG. 1 illustrates a simplified diagram of a wireless communication system, in accordance with an example embodiment.

FIG. 1 illustrates a simplified diagram of a wireless communication system 100, in accordance with an example embodiment System 100 may include a plurality of base stations (BS) 102, 103, 104, and at least one wireless communication unit or UE 130, 131, 132, 133, 134. Although three BS 102-104 and five UEs 130-134 are illustrated in FIG. 1, system 100 may include more or fewer BSs and/or more or fewer UEs. In various embodiments, system 100 may include from one to thousands of BSs and from one to millions of UEs.

In an embodiment, system 100 provides broadcast and/or multicast services (e.g., MBMS), and also employs macro-diversity transmission techniques. "Broadcast" may mean, in various embodiments, a BS's transmission of a signal destined for all UEs of a system. "Multicast" may mean a BS's transmission of a signal destined for a selected group of multiple UEs of a system. For example, a broadcast signal may be destined for all UEs 130-134, whereas a multicast signal may be destined for a subset of UEs (e.g., only UEs 130, 132, 134). "Macro-diversity" or "transmit diversity" may mean, in various embodiments, the transmission by multiple BS of the same information over downlink channels toward a common population of UEs (e.g., into the same cell or cell sector). In an embodiment, multiple BS (e.g., two, three or more BS) may transmit the same information synchronously (e.g., "simulcast"). Transmit diversity may be open loop, in various embodiments. In some WCDMA deployments, each BS may operate asynchronously with respect to other BSs. That is, the timeslot and frame boundaries applicable to the signal transmitted by each BS on a single carrier frequency may not be aligned, or related, in time.

UEs 130-134 may include wireless communication apparatus, which may transmit and/or receive information over an air interface or other wireless communication medium. In an embodiment, UEs 130-134 include receivers that are designed to take advantage of macro-diversity by simultaneously receiving multiple radio links from multiple BSs 102-104, and performing selection combining and/or soft combining of the signals. UEs 130-134 may be selected from a group of equipment types that includes, but is not limited to, cellular telephones, one-way and two-way radios, computers, personal data assistants (PDAs), pagers, and wireless personal area network (WPAN) compatible devices, other types of wireless communication apparatus, and equipment that provides multiple types of functionality, for example.

A BS 102-104, which also may be referred to as "node," "cell site" or "access point," may include a transceiver, which receives uplink radio signals from UEs 130-134 and transmits downlink radio signals toward UEs 130-134. A BS 102-104 may include at least one processing system and at least one air interface (not illustrated). As will be described in more detail later, the at least one processing system may function to encode at least one data code (e.g., using a CDMA technique), and to apply a common scrambling code to the at least one data code. In addition, in an embodiment, the at least one processing system also may function to encode a synchronization code using a TDM technique, resulting in a TDM synchronization code. The at least one air interface may function to transmit the at least one data code during the duration of a timeslot of a radio frame, and in time-synchronization and frequency-synchronization with at least one other base station. In addition, the at least one air interface may function to transmit the TDM synchronization code during a portion of the duration of the timeslot. In various embodiments, the at least one processing system and/or the at least one air interface also may function to discontinuously transmit the portion of the timeslot that would occur when the TDM synchronization code is transmitted.

A group of BSs 102-104 together service a network of cells within which information may be exchanged with UEs 130-134. In an embodiment, a BS 102-104 may include multiple sector transmitters, and accordingly may provide service within multiple cell sectors. For example, as illustrated in FIG. 1, each BS 102-104 may include three sector transmitters, thus providing service within cell sectors 110, 111, 112, 113, 114, 115, 116, 117, 118. Although system 100 illustrates three cell sectors 110-118 associated with each BS 102-104, each BS 102-104 may service a different number of cell sectors (e.g., one, two, four or more).

A "downlink channel" may refer to a channel in which information is conveyed from a BS 102-104 to a population of UEs 130-134, in an embodiment. Conversely, an "uplink channel" may refer to a channel in which information is conveyed from a UE 130-134 to a BS 102-104. In an embodiment, selected ones of BS 102-104 may provide broadcast multicast services on downlink channels within sectors 110-118. Further, in an embodiment, BS 102-104 may provide orders of macro-diversity by simulcasting substantially the same radio signals on downlink channels toward a population of UEs (e.g., UEs 130-134). For example, in various embodiments, two, three or more BS 102-104 may simulcast substantially the same radio signals.

Sectors 110-118 represent geographical areas covered by a BS's antenna system. Sectors 110-118 are modeled as having a hexagonal sector-edge outer boundary. A sector 110-118 may be modeled as having a differently shaped outer boundary. In reality, a sector-edge outer boundary may not accurately be definable using a regular geometric pattern. Instead, a sector-edge outer boundary may be defined as a continuum of points where the BS antenna system's ability to provide coverage falls below a given threshold, for example. Because the communication environment and conditions continuously may change, a sector-edge outer boundary may change dynamically.

Communications between BSs 102-104 and UEs 130-134 may be governed by one or more communication technologies. For example, but not by way of limitation, communications between BSs 102-104 and UEs 130-134 may use any of a number of modulation and multiple access technologies. In various embodiments, modulation and multiple access on the uplink and/or downlink may be performed using one or more technologies selected from a group of technologies that includes, but is not limited to, Time Division Multiple Access (TDMA), Frequency Division Multiple Access (FDMA), CDMA, WCDMA, Orthogonal FDMA (OFDMA), Interleaved FDMA (IFDMA), Discrete Fourier Transform (DFT) spread OFDMA (DFT OFDMA), Spatial Division Multiple Access (SDMA), or combinations thereof, for example.

Information is conveyed between BSs 102-104 and UEs 130-134 on the uplink and downlink over physical channels. A physical channel may be defined by a specific carrier frequency, scrambling code, channelization code, start time, and stop time. On the uplink, a physical channel additionally may be defined by a relative phase (e.g., 0 or $\pi/2$). The default time duration for a physical channel is continuous from the instant when it is started to the instant when it is stopped (e.g., the difference between the stop time and the start time).

Several downlink physical channels of interest for the purposes of this description are the Primary Common Pilot Channel (P-CPICH), the Primary Common Control Physical Channel (P-CCPCH), the Secondary Common Control Physical Channel (S-CCPCH), the Primary Synchronization Channel (P-SCH), and the Secondary Synchronization Channel (S-SCH). The P-CPICH is a fixed-rate downlink physical channel that carries a fixed bit sequence The P-CCPCH may be a fixed rate (e.g., 30 kilobits per second (kbps)) downlink physical channel, which employs a particular spreading factor (SF) (e.g., SF=256). The S-CCPCH also may be a fixed rate (e.g., 30 kbps) downlink physical channel, which employs a particular spreading factor (e.g., SF=256), in an embodiment, although other S-CCPCH data rates and spreading factors may be supported. The P-SCH may include a single length-256 chip word, which is common to all cells, and which may be transmitted during the first 256 chips of each timeslot (e.g., slot 303, FIG. 3). The S-SCH may include cell-specific sequences of length-256 chip words, and the S-SCH also may be transmitted in the first 256 chips of each timeslot, in the same time epoch as the P-SCH. Under the Orthogonal Variable Spreading Factor (OVSF) structure used in a 3GPP WCDMA forward link, some physical channels (e.g., P-CPICH and P-CCPCH) are mutually orthogonal to each other and to the S-CCPCH. However, the P-SCH and S-SCH codes are not scrambled by the primary scrambling code applied to the OVSF orthogonal channels, and are not orthogonal to the other channels.

Transport channels may be defined by how and with what characteristics data is transferred over the air interface. Transport channels are capable of being mapped to physical channels. In a 3GPP MBMS standard, there are several different uplink and downlink transport channels. For the purposes of this description, a particular downlink transport channel of interest is a Forward Access Channel (FACH). In an embodiment, the S-CCPCH is used to carry the FACH, and the FACH is transmitted over an entire cell.

MBMS related logical channels, including the MBMS Traffic Channel (MTCH), MBMS Control Channel (MCCH), and MBMS Scheduling Channel (MSCH) are carried over the FACH, and are mapped onto the S-CCPCH. The S-CCPCH may include a single spreading code. Various other downlink physical channels, (e.g., "Physical Channels and Mapping of Transport Channels onto Physical Channels (FDD) (Release 7)," 3GPP Technical Specification Group Radio Access Network, March 2006, 3GPP TS 25.211, ver. 7.0.0, herein "3GPP Technical Specification 25.211") also may be transmitted to support a WCDMA deployment, including the Code Division Multiplexed (CDM) Primary (or secondary) Common Pilot Channel (P-CPICH), Primary Common Control Physical Channel (P-CCPCH), Primary Synchronization Channel (P-SCH), and Secondary Synchronization Channel (S-SCH).

3GPP specifications generally support a time-slotted air interface structure, with timeslots having durations of about 0.67 milliseconds (ms). A restricted set of timeslot formats may be applicable to MBMS, and these may be used in combination with particular transmission time intervals (TTI) over which a transport block may be transmitted.

Figure 2:
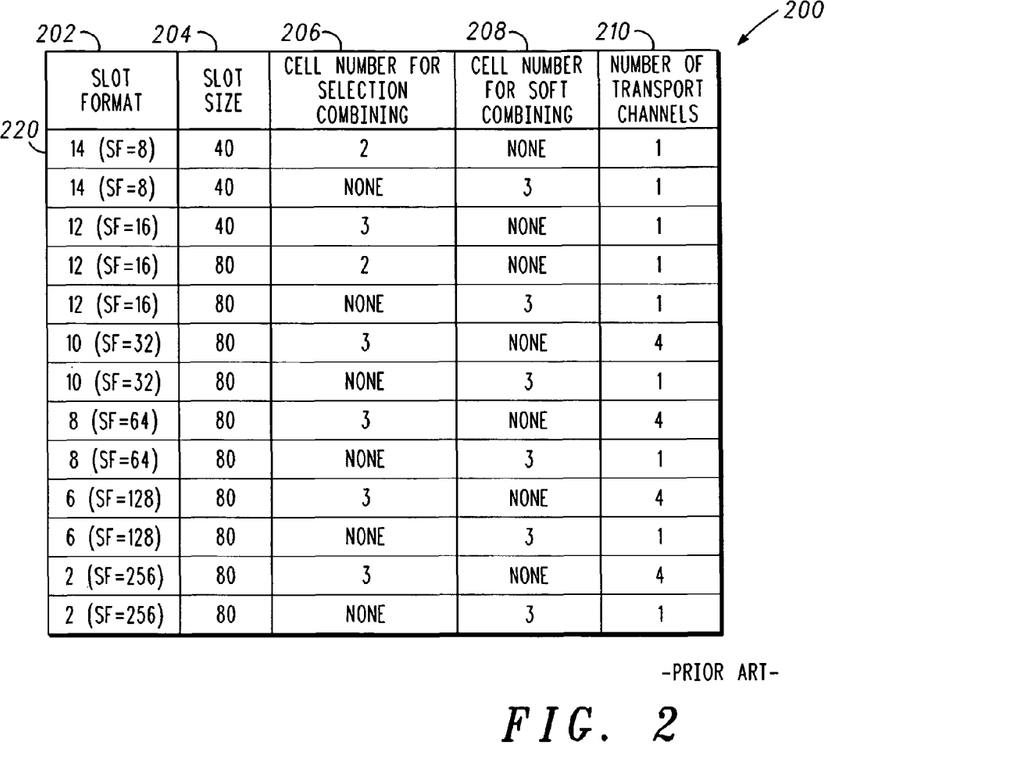
FIG. 2 illustrates a table of supported timeslot formats, in accordance with an MBMS specification.

FIG. 2 illustrates a Table 200 of supported timeslot formats, in accordance with an MBMS specification (e.g., "Introduction of the Multimedia Broadcast Multicast Service (MBMS) in the Radio Access Network (RAN); Stage 2 (Release 7)," 3GPP Technical Specification Group Radio Access Network, June 2006, 3GPP TS 25.346, ver. 7.1.0.). Table 200 includes a slot format field 202, a slot size field 204, a cell number for selection combining field 206, a cell number for soft combining field 208, and a number of transport channels field 210. Further, Table 200 includes multiple records 220, each of which specifies a slot size and macro-diversity information for a given slot format identified in slot format field 202.

Slot format field 202 may include values for spreading factors (SF) associated with an S-CCPCH. Slot size field 204 may include values for a FACH TTI (e.g., a slot size), in ms. Cell number for selection combining field 206 may include values indicating a macro-diversity order, or a maximum number of cells for S-CCPCH selection combining. Cell number for soft combining field 208 may include values indicating a macro-diversity order, or a maximum number of cells for S-CCPCH soft combining. Finally, number of transport channels field 210 may include values indicating a maximum number of simultaneous transport channels per S-CCPCH. Table 200 illustrates that a variety of spreading factors and slot sizes may be supported, along with downlink macro-diversity orders of between 2 and 3.

Figure 3:
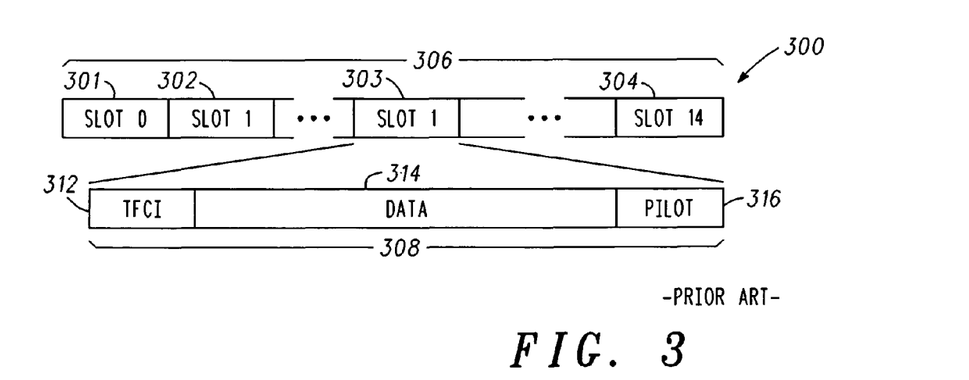
FIG. 3 illustrates a frame structure for a radio frame, in accordance with an MBMS specification.

FIG. 3 illustrates a frame structure for an S-CCPCH radio frame 300, in accordance with an MBMS specification (e.g., 3GPP Technical Specification 25.211). Radio frame 300 includes multiple timeslots or "slots" 301, 302, 303, 304. For example, radio frame 300 may include fifteen slots. A radio frame duration 306, $T_f$, or a slot duration 308, $T_{slot}$, may be defined by a difference between a stop time and a start time.

These durations may be measured in milliseconds (ms) and/or integer numbers of chips. For example, a radio frame duration may be approximately 38,400 chips (e.g., 10 ms), and a slot duration may be approximately 2560 chips (e.g., 0.67 ms).

Slot 303 may include a Transport Format Combination Indicator (TFCI) field 312, a data field 314, and a pilot field 316. TFCI field 312 may include values that indicate, to a receiver, which of multiple possible transport format combinations is used for a slot 303. A TFCI value in TFCI field 312 may correspond to a certain transport format combination of a FACH currently in use. TFCI field 312 may include a number of TFCI bits, $N_{TFCI}$, which may depend on a format selected for the slots within data field 314. For example, $N_{TFCI}$ may be 2 or 8, according to an MBMS specification. TFCI bits may be transmitted within a first 256 chips of slot 303. Alternatively, slot 303 may not include a TFCI field (e.g., $N_{TFCI}=0$).

Pilot field 316 may include a number of pilot bits, $N_{pilot}$, which a receiver may use to confirm frame synchronization. Pilot field 316 may include Code Division Multiplexed (CDM) symbols known a priori to the receiver, which may render them suitable for channel estimation purposes. Pilot symbols included within pilot field 316 may be referred to herein as a CDM pilot. The number of pilot bits, $N_{pilot}$, may depend on a format selected for the slots. For example, $N_{pilot}$ may be 8 or 16, according to a MBMS specification. Alternatively, the S-CCPCH may not include a pilot field (e.g., $N_{pilot}=0$).

Data field 314 may include at least one data code, such as at least one CDMA data code, which may be represented in a number of bits, $N_{data}$. The number of bits, $N_{data}$, may depend on a format selected for slot 303. For example, $N_{data}$ may be $20*2^k$ bits, where k=0 to 6. The format of slots 310 may be selected from one of several possible formats. Each of the slot formats may have a different transport format combination, where format related parameters may include channel bit rate, channel symbol rate, spreading factor, number of bits/frame, number of bits/slot, $N_{data}$, $N_{pilot}$, and $N_{TFCI}$, for example.

Figure 4:
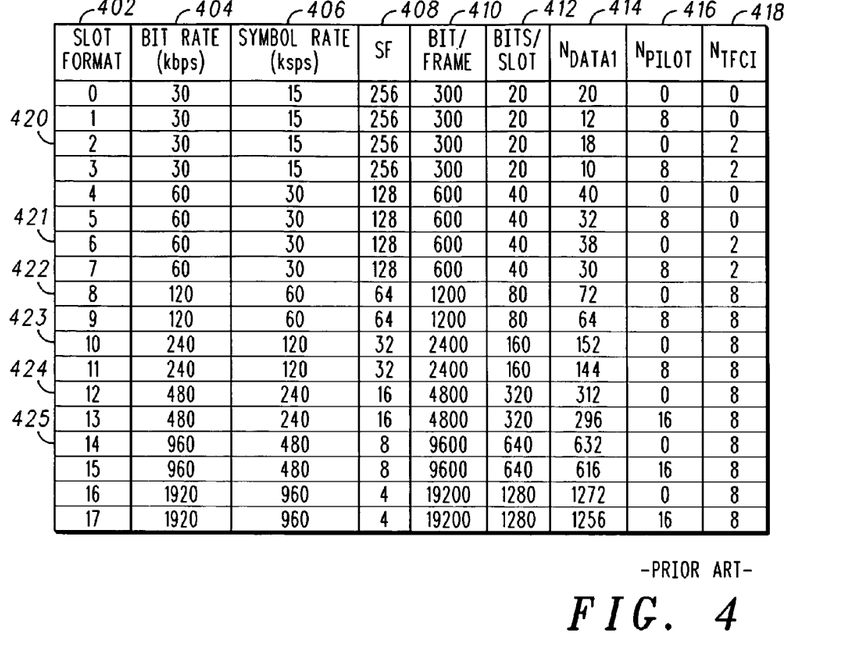
FIG. 4 illustrates a table representing multiple transport format combinations, in accordance with an MBMS specification.

FIG. 4 illustrates a Table 400 representing multiple transport format combinations associated with an S-CCPCH, in accordance with an MBMS specification (e.g., 3GPP TS 25.211). Table 400 includes a slot format field 402, a channel bit rate field 404 (in kilobits per second (kbps)), a channel symbol rate field 406 (in kilosymbols per second (ksps)), a spreading factor (SF) field 408, a number of bits/frame field 410, a number of bits/slot field 412, an $N_{data}$ field 414, an $N_{pilot}$ field 416, and an $N_{TFCI}$ field 418. Further, table 400 includes multiple records, each of which specifies a transport format combination for a given slot format identified in slot format field 402. In accordance with an MBMS specification, S-CCPCH slot formats specified for MBMS include those associated with records 420, 421, 422, 423, 424, 425. More, fewer or different slot formats may be specified for a multicast broadcast service.

As mentioned above, according to an MBMS specification (e.g., 3GPP Technical Specification 25.211), channel estimation may be performed using a CDM pilot (e.g., pilot field 316, FIG. 3) of an S-CCPCH frame (e.g., frame 300) or CDM pilot signals of a CPICH. Embodiments of the inventive subject matter include providing a Time Division Multiplexed (TDM) synchronization code or pilot in addition to or instead of a CDM pilot A TDM synchronization code may be used for channel estimation purposes, in various embodiments. Channel estimation based on a TDM synchronization code may be superior to channel estimation based on a CDM pilot due to, for example, contamination of the CDM pilot sequence from data or other codes. This may be particularly apparent, for example, in systems that are not interference limited (e.g., SFN broadcast systems). In a particular embodiment, a TDM synchronization code is used instead of a CDM pilot for channel estimation purposes (e.g., a CDM pilot may optionally be present). In another embodiment, both a TDM synchronization code and a CDM pilot may be used for channel estimation purposes. In still another embodiment, a TDM synchronization code may be used, and when particular channel conditions are present (e.g., high Doppler frequencies), a CDM pilot may additionally be used for channel estimation purposes.

In an embodiment, a currently provisioned P-SCH and S-SCH are used to form a TDM synchronization code or pilot symbol. The TDM synchronization code or pilot symbol thus may be referred to herein as a "TDM synchronization code," a "TDM pilot symbol," a "TDM P-/S-SCH symbol" or simply as "TDM P-/S-SCH." In an embodiment, a broadcast or multicast service may be provided, using SFN techniques, by transmitting a combination of a CPICH signal or code, a P-CCPCH signal or code, a TDM synchronization code, and one or more S-CCPCH signals or codes (e.g., CDMA data codes) in a time-synchronous and frequency-synchronous manner, using a common scrambling code. In an embodiment, the common scrambling code may be a scrambling code used by at least one other base station. In addition, in an embodiment a period of the common scrambling code is equal to or approximately equal to the duration of a timeslot. In an embodiment, rapid identification of a MBMS carrier may be achieved by reserving a set of scrambling codes for dedicated carriers bearing multicast broadcast service only.

In an embodiment, in order to commonly identify the scrambling code and the TDM synchronization code to each BS participating in delivering synchronous broadcast or multicast service, a mapping may be constructed which maps a network identifier into a subset of scrambling codes and TDM synchronization codes. For example, in a particular embodiment, transmitting the TDM synchronization code may include transmitting a P-SCH and transmitting an S-SCH in parallel with the P-SCH. At least one of a P-SCH symbol for transmission on the P-SCH, an S-SCH symbol for transmission on the S-SCH, and the common scrambling code may be selected according to a common broadcast network identifier In another embodiment, at least one of a P-SCH symbol for transmission on the P-SCH, an S-SCH symbol for transmission on the S-SCH, and the common scrambling code may be selected from a set of P-SCH symbols, S-SCH symbols, and common scrambling codes reserved for use in delivering a service selected from a group of services that includes a broadcast service and a multicast service.

In an embodiment, the scrambling codes and TDM synchronization codes may be selected from a broader set of 3GPP-defined scrambling codes and P-/S-SCH symbols. The selected scrambling codes and TDM synchronization codes may be reserved for multicast or broadcast service use to prevent, for example, a device not subscribed to multicast or broadcast service from attempting to access a carrier frequency reserved for multicast or broadcast service use. In an embodiment, the CDMA data codes and the TDM synchronization code are transmitted on a carrier frequency dedicated to a service selected from a group of services that includes a broadcast service and a multicast service. In an embodiment, S-CCPCH components overlapping in time with the TDM synchronization code may be discontinuously transmitted (e.g., suppressed or removed) to permit direct observation of the known TDM synchronization code. The term "discontinuously transmit," as used herein may mean the suppression or removal of at least one bit or field of a signal.

Figure 5:
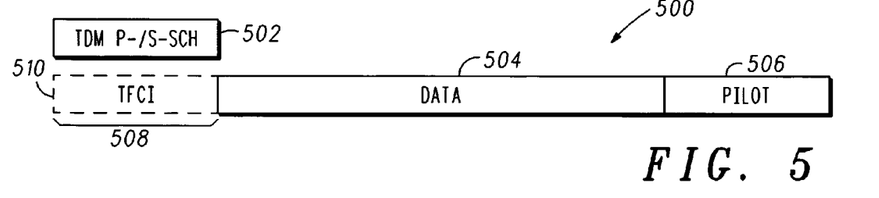
FIG. 5 illustrates a slot format, in accordance with an example embodiment.

FIG. 5 illustrates an S-CCPCH slot format 500 and a TDM P-/S-SCH symbol 502, in accordance with an example embodiment. Slot format 500 includes a data field 504 and a pilot field 506. Data field 504 may include at least one data code, such as at least one CDMA data code, which may be represented in a number of bits, $N_{data}$. The number of bits, $N_{data}$, may depend on a format selected for slot 500. For example, $N_{data}$ may be $20*2^k$ bits, where k=0 to 6. The term "CDMA data code" refers to a data code that has been encoded using a CDMA technique, such as CDMA, WCDMA, or other variations of CDMA techniques. In alternate embodiments, techniques other than CDMA or its variants may be used to encode a data code.

In an embodiment, TDM P-/S-SCH symbol 502 is transmitted during a time period 508 when TFCI bits normally would be transmitted according to another MBMS specification (e.g., during TFCI field 312, FIG. 3). Accordingly, in an embodiment, TDM P-/S-SCH symbol 502 may be transmitted within a time period 508 that normally would include a first 256 chips of slot 500. In an embodiment, a BS discontinuously transmits (e.g., suppresses or removes) TFCI bits (e.g., as indicated by a dashed box around TFCI field 510) to permit direct observation of the TDM P-/S-SCH symbol 502 at the UE. In other words, the BS discontinuously transmits bits of the TFCI field during the portion of the timeslot where the TDM synchronization code is transmitted.

Pilot field 506 may include a CDM symbol, which may be used in addition to TDM P-/S-SCH symbol 502 for channel estimation purposes. The number of pilot bits, $N_{pilot}$, may depend on a format selected for the slots within data field 504. Alternatively, slot 500 may not include a pilot field (e.g., $N_{pilot}=0$). In addition, in an embodiment, a Primary or Secondary (P-/S-) Common Pilot Channel (P/S-CPICH) also may be available for channel estimation purposes.

Figure 6:
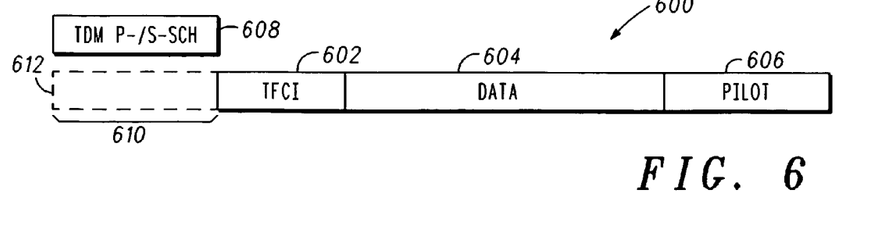
FIG. 6 illustrates a slot format, in accordance with another example embodiment.

In another embodiment, a TDM P-/S-SCH symbol is transmitted along with a TFCI field, a shortened data field, and a pilot field. FIG. 6 illustrates an S-CCPCH slot format 600 and a TDM P-/S-SCH symbol 608, in accordance with another example embodiment. In an embodiment, the time period occupied by the TFCI, data, and pilot portions of slot format 600 has a shorter duration than for the slot format 300 illustrated in FIG. 3. In a particular embodiment, the TFCI, data, and pilot portions of slot 600 sum to a duration of approximately 256 chips shorter than the duration of slot 300. Viewed another way, the slot format 600 is effectively 256 chips shorter than the slot format 300. For example, when slot 300 has a 2560 chip duration, slot 600 may have a 2304 chip duration.

Slot format 600 includes a TFCI field 602, data field 604, and a pilot field 606. TFCI field 602 may include values that indicate, to a receiver, which of multiple possible transport format combinations is used for slot 600. Data field 604 may include at least one data code, such as at least one CDMA data code, which may be represented in a number of bits, $N_{data}$. The number of bits, $N_{data}$, may depend on a format selected for slot 600, and which enable TFCI bits to be transmitted so that they do not overlap with TDM P-/S-SCH symbol 608. TFCI field 602 is shown to occur in the first portion of slot 600. Accordingly, TFCI field 602 may be adjacent to TDM P-/S-SCH symbol 608. In other embodiments, TFCI field 602 may occur after either or both of data field 604 and/or pilot field 606, or in any portion of slot 600 that does not overlap TDM P-/S-SCH symbol 608.

In an embodiment, TDM P-/S-SCH symbol 608 is transmitted during a time period 610 that occurs consecutively with and prior to transmission of slot 600, or during a time period 610 when TFCI bits normally would be transmitted according to another MBMS specification (e.g., during TFCI field 312, FIG. 3), as indicated by dashed box 612. Alternatively, TFCI bits may be considered to be shifted into a portion of the timeslot occupied by a set of bits of the data field, where the set of bits of the data field are displaced into the area that the TFCI normally would occupy according to another MBMS specification (e.g., the area indicated by dashed box 612). In such an embodiment, TFCI field 602 is located in a portion of the timeslot that is not overlapping with the portion of the timeslot where the TDM P-/S-SCH symbol 608 is transmitted. The BS may discontinuously transmit the displaced set of bits of the data field (e.g., the set of bits of the data field during the portion of the timeslot where the TDM P-/S-SCH symbol 608 is transmitted). Either way, because TDM P-/S-SCH symbol 608 does not overlap slot 600, it may be directly observed at the UE.

Pilot field 606 may include a CDM symbol, which may be used in addition to TDM P-/S-SCH symbol 608 for channel estimation purposes. The number of pilot bits, $N_{pilot}$, may depend on a format selected for the slots within data field 604. Alternatively, slot 600 may not include a pilot field (e.g., $N_{pilot}=0$). The P-CPICH or S-CPICH may also be available for channel estimation purposes, in various embodiments.

Figure 7:
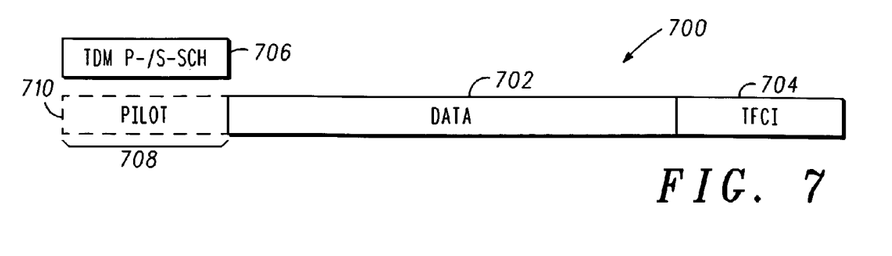
FIG. 7 illustrates a slot format, in accordance with another example embodiment.

In still another embodiment, a TDM P-/S-SCH symbol is transmitted along with a data field, and a TFCI field. FIG. 7 illustrates an S-CCPCH slot format 700 and a TDM P-/S-SCH symbol 706, in accordance with another example embodiment. Slot format 700 includes a data field 702 and a TFCI field 704. Data field 702 may include at least one data code, such as at least one CDMA data code, which may be represented in a number of bits, $N_{data}$. The number of bits, $N_{data}$, may depend on a format selected for slot 700. TFCI field 704 may include values that indicate, to a receiver, which of multiple possible transport format combinations is used for slot 700.

TFCI field 704 is shown to occur in the last portion of slot 700, where pilot bits normally would be transmitted according to another MBMS specification (e.g., during pilot field 316, FIG. 3). Additionally, in an embodiment, TDM P-/S-SCH symbol 706 is transmitted during a time period 708 that occurs consecutively with and prior to transmission of slot 700, so that TDM P-/S-SCH symbol 706 does not overlap slot 700. Time period 708 corresponds to a time period when TFCI bits normally would be transmitted according to another MBMS specification (e.g., during TFCI field 312, FIG. 3), although the TFCI field and the pilot fields have been interchanged according to the illustrated embodiment In an embodiment, a BS discontinuously transmits (e.g., suppresses or removes) pilot bits (e.g., as indicated by a dashed box around pilot field 710) to permit direct observation of the TDM P-/S-SCH symbol 706 at the UE. In other words, the BS discontinuously transmits bits of the pilot field during the portion of the timeslot where the TDM synchronization code is transmitted.

The embodiments illustrated in FIGS. 5-7 may permit time-synchronous and frequency-synchronous transmission of common TDM P-/S-SCH sequences by BSs participating in an SFN. The TDM P-/S-SCH symbols may be observable without interference from unpredictable CDM data symbols from the S-CCPCH channels bearing the MBMS data.

As a result of the revised S-CCPCH slot structures illustrated in FIGS. 5-7, an arithmetic sum of the P-SCH and S-SCH symbols, plus the component of any scrambled CPICH signal overlaying the SCH symbols, may form a composite TDM pilot sequence used in a UE for the purposes of performing channel estimation. In other embodiments, discontinuous transmission of the P-CPICH sequence over the duration of the SCH is also a feasible approach. The resulting kernel of the least square (LS) channel estimator may be formed by a combined transmission of the P-SCH and S-SCH symbols, and optionally a scrambled P-CPICH sequence, in an embodiment. This may be periodic with a sequence length of fifteen length-256 words (e.g., a number of words that is equal to the number of timeslots in a radio frame).

The TDM synchronization code may be used to perform channel estimation using either linear or non-linear methods, in various embodiments. The linear or nonlinear operators used for the channel estimation methods may be pre-computed for a finite set of TDM synchronization codes that are known to both the transmitter and the receiver. The precomputed linear or non-linear operators may be stored at the receiver to perform channel estimation quickly, in an embodiment. This may provide an advantage of reducing the complexity of computing these operators frequently.

OFDM air interface designs may achieve higher post-equalizer SNR's through the use of cyclic prefix methods. Using such techniques, the time-domain structure of each OFDM symbol may be cyclically extended, which may permit suppression of equalizer channel edge effects and inter-symbol interference. In an embodiment, a specific time-domain data segment may be extracted from a data payload and used to cyclically extend the time-domain data symbol. In an alternate embodiment, which does not use a cyclic extension of the data field, an identical SCH symbol is present in each timeslot, as illustrated in FIG. 5.

Figure 8:
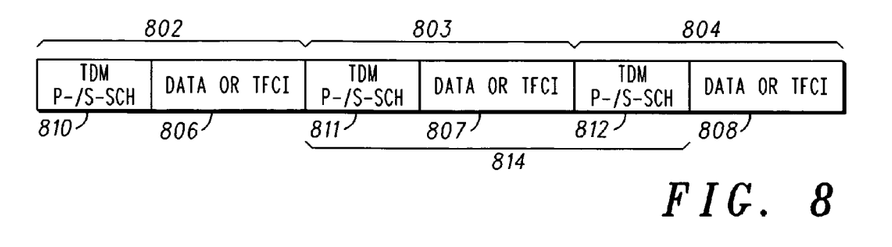
FIG. 8 illustrates a cyclically-extended slot format, in accordance with an example embodiment.

FIG. 8 illustrates a cyclically-extended S-CCPCH slot format, in accordance with an example embodiment. Three slots 802, 803, 804 are illustrated, where each slot 802-804 may include a data field 806, 807, 808. TDM P-/S-SCH symbol 810, 811, 812 are transmitted in conjunction with each data field 806-808. In an embodiment, for each data field 806-808, a combination of a preceding and a succeeding TDM P-/S-SCH symbol 810-812 provides a cyclically extended structure. In other words, in an embodiment, the TDM P-/S-SCH symbol may be cyclically extended. Accordingly, a cyclically extended field 814 may be formed, for example, from a preceding TDM P-/S-SCH symbol (e.g., symbol 811), a data field (e.g., data field 807), and a succeeding TDM P-/S-SCH symbol (e.g., symbol 812). According to an embodiment, the cyclically extended field 814 is provided without extracting and/or repeating a portion of an S-CCPCH data field.

According to an embodiment, because a single "virtual" cell is formed by the SFN in the dedicated carrier frequency, inter-cell measurements for mobility purposes may not be performed. Accordingly, an S-SCH symbol may not be transmitted, and only a P-SCH may be transmitted, in an embodiment. In an alternate embodiment, one of the component length-256 symbols comprising an S-SCH sequence may be transmitted in combination with a P-SCH, where the same S-SCH symbol may be used in all sub-frames. Radio frame synchronization may be achieved either by neglecting the scrambling code, using a scrambling code with a period equal to a timeslot duration, in various embodiments.

Transmission of a P-CCPCH is performed for transport of SFN-specific Broadcast Control Channel (BCCH) messaging. A P-CCPCH may be discontinuously transmitted during SCH transmission. For large cell radii, a cyclic prefix (CP) (and hence an SCH) size greater than 256 chips may be used, in an embodiment This may be achieved, in an embodiment, by extending P-/S-SCH synchronization codes, and by further discontinuously transmitting a portion of a P-CCPCH such that the extended SCH and P-CCPCH do not overlap.

In other embodiments, Generalized Chirp Like (GCL) sequences may be used in place of an SCH sequence to form a TDM pilot. In other words, in an embodiment, a TDM synchronization code may include a GCL sequence. Use of GCL sequences may improve channel estimation and equalizer performance. Further, to simplify channel estimation, the GCL sequences may themselves be provided with a cyclic prefix.

Figure 9:
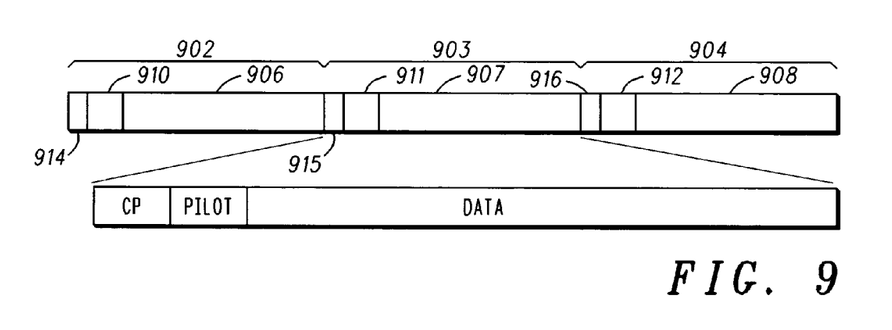
FIG. 9 illustrates a cyclically prefixed pilot, in accordance with an example embodiment.

FIG. 9 illustrates a cyclically prefixed pilot, in accordance with an example embodiment. Three slots 902, 903, 904 are illustrated, where each slot 902-904 may include a data field 906, 907, 908. A TDM pilot 910, 911, 912 is transmitted in conjunction with each data field 906-908. In an embodiment, for each TDM pilot 910-912, a cyclic prefix (CP) 914, 915, 916 is transmitted. In an embodiment, a data field 906-908 may have a duration of about 2304 chips, a TDM pilot 910-912 may have a duration of about 160 chips, and a CP 914-916 may have a duration of about 96 chips. In other embodiments, data fields 906-908, TDM pilots 910-912, and/or CPs 914-916 may have longer or shorter durations.

According to some 3GPP specifications, Quadrature Phase Shift Key (QPSK) modulation is supported on an S-CCPCH. In various embodiments, spectral efficiencies of an SFN-enhanced multicast broadcast system, particularly in small cell networks, may be improved using relatively high order modulations (e.g. 16-QAM (Quadrature Amplitude Modulation) and 64-QAM). According to an MBMS standard, a lowest S-CCPCH spreading factor that is supported for MBMS may be 8. In various embodiments, higher throughput may be achieved using lower spreading factors of 4 and 2 with slot formats described in conjunction with various embodiments.

In still other embodiments, an S-CCPCH may be replaced with a High Speed Physical Downlink Shared Channel (HS-PDSCH) and an associated transport channel, a High Speed Shared Control Channel (HS-SCCH). Accordingly, in such an embodiment, the data codes may include HS-PDSCH codes. In a particular embodiment, a 0.67 ms timeslot structure (e.g., a structure of a previously-described embodiment) may be revised to conform to a 3-timeslot, 2 ms TTI structure associated with an HS-PDSCH. Additionally, in an embodiment, length-16 spreading codes may be applied for HS-PDSCH construction. In such an embodiment, a TDM pilot (e.g., a combined P-/S-SCH structure of a previously-described embodiment) may be accommodated by discontinuously transmitting (e.g., suppressing or removing) an integer number of HS-PDSCH codes during each timeslot comprising an HS-DSCH TTI.

Figure 10:
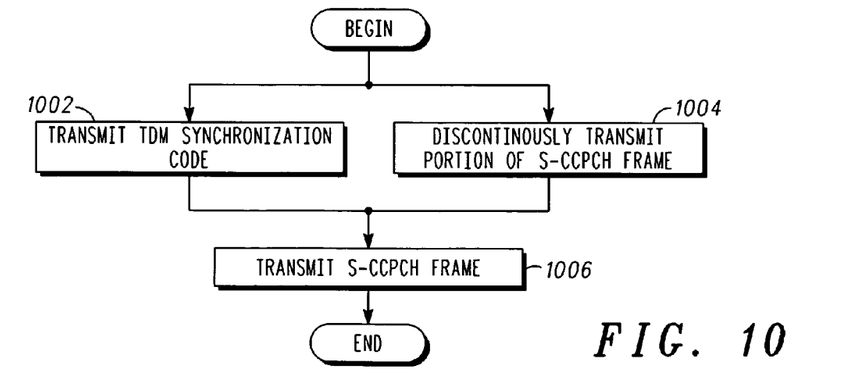
FIG. 10 illustrates a flowchart of a method for providing service in a wireless network, in accordance with an example embodiment.

FIG. 10 illustrates a flowchart of a method for providing service (e.g., multicast and/or broadcast service) in a wireless network in accordance with an example embodiment. The method may be performed by a BS (e.g., BS 102-104, FIG. 1). In an embodiment, the method may begin by transmitting a TDM synchronization code (e.g., a TDM P-/S-SCH symbol) during a first portion of a timeslot of a radio frame, in block 1002. In an embodiment, transmitting the TDM synchronization code may include transmitting a Primary Synchronization Channel (P-SCH). In another embodiment, transmitting the TDM synchronization code may include transmitting a P-SCH and transmitting a Secondary Synchronization Channel (S-SCH) in parallel with the P-SCH. In still another embodiment, transmitting the TDM synchronization code may include transmitting a P-SCH and transmitting an S-SCH in parallel with the P-SCH, and transmitting a Common Pilot Channel (CPICH) in parallel with the P-SCH and the S-SCH. In a further embodiment, an S-SCH symbol of the S-SCH may be time-invariant between timeslots of a radio frame.

In block 1004, which may be performed in parallel with block 1002, the BS may discontinuously transmit the first portion of the timeslot of the radio frame (e.g., an S-CCPCH frame), in an embodiment. For example, as described previously, the BS may discontinuously transmit bits of a TFCI, data field, and/or pilot field during the portion of the timeslot where the TDM synchronization code is transmitted, in accordance with various embodiments. In another embodiment, a shortened S-CCPCH slot (e.g., FIG. 6) may be provided, for which discontinuous transmission of a portion of an S-CCPCH frame may not be performed Either way, the BS transmits a TDM synchronization code in a manner that the symbol does not overlap continuously transmitted portions of the S-CCPCH frame, and/or to permit direct observation of the TDM synchronization code at the UE.

In block 1006, the base station may transmit at least one data code associated with the timeslot (e.g., at least one CDMA data code), along with the portions of the timeslot that are not discontinuously transmitted. As described previously, transmitting the at least one data code may include transmitting an S-CCPCH. In an embodiment, data codes are transmitted using a common scrambling code. In other embodiments, the method also may include transmitting a code division multiplexed P-CCPCH and/or a code division multiplexed CPICH. In an embodiment in which a CPICH is transmitted, the BS may discontinuously transmit the CPICH during the portion of the duration of the timeslot where the TDM synchronization code is transmitted. The method may then end.

The sequence of process blocks illustrated in FIG. 10 are for example purposes, and are not to limit the scope of the inventive matter only to those process sequences. Instead, it is to be understood that, in alternate embodiments, some or all of the process blocks illustrated in FIG. 10 may be performed in different orders, may be performed in parallel, may be combined together, may be expanded into multiple sub-processes, and/or may include one or more intermediate processes that are not illustrated. In addition, some of the process blocks may be optionally performed, in various embodiments.

Thus, various embodiments of wireless multicast broadcast service methods and apparatus have been described. While the principles of the inventive subject matter have been described above in connection with specific systems, apparatus, and methods, it is to be clearly understood that this description is made only by way of example and not as a limitation on the scope of the inventive subject matter. For example, the illustrated and described embodiments are not meant to preclude operation on a paired carrier basis Further, the phraseology or terminology employed herein is for the purpose of description and not of limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives modifications, equivalents, and variations as fall within the spirit and broad scope of the appended claims and their legal equivalents.

What is claimed is:

1. A method performed by a base station for providing service in a wireless network, the method comprising:
    forming a cyclically extended structure that includes a first Time Division Multiplexed (TDM) synchronization code and a plurality of bits;
    transmitting the first TDM synchronization code over a synchronization channel during a first portion of a duration of a timeslot of a radio frame;
    transmitting the plurality of bits over a common control physical channel (CCPCH) during a second portion of the duration of the timeslot of the radio frame, wherein the second portion does not overlap the first portion in time, and wherein the plurality of bits include at least one data code to which a common scrambling code has been applied, and wherein the common scrambling code is a scrambling code used by at least one other base station, and wherein the base station transmits the plurality of bits in time-synchronization and frequency-synchronization with the at least one other base station;
    transmitting a second TDM synchronization code over the synchronization channel, wherein the first and second TDM synchronization codes are configured to be used by a wireless communication unit for channel estimation purposes; and
    wherein transmitting the plurality of bits over the CCPCH includes discontinuing transmission over the CCPCH during the first portion of the timeslot when the first TDM synchronization code is transmitted.

2. The method of claim 1, wherein the at least one data code and the TDM synchronization code are transmitted on a carrier frequency dedicated to a service selected from a group of services that includes a broadcast service and a multicast service.

3. The method of claim 1, wherein transmitting the TDM synchronization code comprises:
    transmitting a Primary Synchronization Channel (P-SCH).

4. The method of claim 1, wherein transmitting the TDM synchronization code comprises:
    transmitting a Primary Synchronization Channel (P-SCH); and
    transmitting a Secondary Synchronization Channel (S-SCH) in parallel with the P-SCH.

5. The method of claim 4, wherein an S-SCH symbol of the S-SCH is time-invariant between timeslots of the radio frame.

6. The method of claim 4, further comprising:
    selecting at least one of a P-SCH symbol for transmission on the P-SCH, an S-SCH symbol for transmission on the S-SCH, and the common scrambling code according to a common broadcast network identifier.

7. The method of claim 4, further comprising:
    selecting at least one of a P-SCH symbol for transmission on the P-SCH, an S-SCH symbol for transmission on the S-SCH, and the common scrambling code from a set of P-SCH symbols, S-SCH symbols, and common scrambling codes reserved for use in delivering a service selected from a group of services that includes a broadcast service and a multicast service.

8. The method of claim 1, wherein a period of the common scrambling code is approximately equal to the duration of the timeslot.

9. The method of claim 1, wherein transmitting the at least one data code comprises:
transmitting a Secondary Common Control Physical Channel (S-CCPCH).

10. The method of claim 1, wherein the at least one data code includes a High Speed Physical Downlink Shared Channel (HS-PDSCH) code.

11. The method of claim 1, further comprising:
transmitting a code division multiplexed Primary Common Control Physical Channel (P-CCPCH).

12. The method of claim 1, further comprising:
transmitting a code division multiplexed Common Pilot Channel (CPICH).

13. The method of claim 12, further comprising:
discontinuously transmitting the CPICH during the portion of the duration of the timeslot where the TDM synchronization code is transmitted.

14. The method of claim 1, wherein the TDM synchronization code includes a Generalized Chirp Like (GCL) sequence.

15. The method of claim 1, wherein discontinuing transmission is performed to permit direct observation of the first TDM synchronization code by the wireless communication unit.

16. The method of claim 1, wherein discontinuing transmission is performed by suppressing or removing bits during the portion of the timeslot when the first TDM synchronization code is transmitted.

17. The method of claim 1, wherein the cyclically extended structure also includes the second TDM synchronization code.

18. An apparatus within a base station, the apparatus comprising:
at least one processing system to produce at least one data code, and to apply a common scrambling code to the at least one data code, wherein the common scrambling code is a scrambling code used by at least one other base station, and wherein the at least one processing system also is to form a cyclically-extended structure, wherein the cyclically-extended structure includes a first Time Division Multiplexed (TDM) synchronization code and a plurality of bits; and
at least one air interface to transmit the first TDM synchronization code over a synchronization channel during a first portion of a duration of a timeslot of a radio frame, to transmit the plurality of bits over a common control physical channel (CCPCH) during a second portion of the duration of the timeslot of the radio frame that does not overlap the first portion, and wherein the plurality of bits include the at least one data code to which the common scrambling code has been applied, and to transmit a second TDM synchronization code during a first portion of a duration of a next timeslot, wherein the first and second TDM synchronization codes are configured to enable a wireless communication unit to perform channel estimation, and wherein the at least one air interface transmits the at least one data code in time-synchronization and frequency-synchronization with at least one other base station, and wherein the apparatus discontinues transmission over the CCPCH during the first portion of the timeslot.

19. A method performed in a wireless network that includes a base station and a wireless communication unit, the method comprising:
the base station forming a cyclically extended structure that includes a first Time Division Multiplexed (TDM) synchronization code and a plurality of bits:
the base station transmitting the first TDM synchronization code over a first synchronization channel during a first portion of a duration of a timeslot of a radio frame;
the base station transmitting the plurality of bits over a common control physical channel (CCPCH) during a second portion of the duration of the timeslot of the radio frame, wherein the second portion does not overlap the first portion, and wherein the plurality of bits include at least one data code to which a common scrambling code has been applied, and wherein the common scrambling code is a scrambling code used by at least one other base station, and wherein the base station transmits the plurality of bits in time-synchronization and frequency-synchronization with the at least one other base station;
the wireless communication unit receiving the TDM synchronization code; and
the wireless communication unit using the TDM synchronization code to perform channel estimation.

20. The method of claim 19, further comprising:
transmitting a second TDM synchronization code over a second synchronization channel during the first portion of the duration of the timeslot, wherein a TDM pilot sequence is formed, at least in part, from an arithmetic sum of the first TDM synchronization code and the second TDM synchronization code.

21. The method of claim 19, further comprising:
transmitting a second TDM synchronization code over a second synchronization channel during the first portion of the duration of the timeslot; and
transmitting a common pilot channel (CPICH) signal overlaying the first and second TDM synchronization codes, wherein a TDM pilot sequence is formed from an arithmetic sum of the first TDM synchronization code, the second TDM synchronization code, and the CPICH signal.

* * * * *